Feb. 23, 1954 W. P. HESCH 2,669,798
COLLAPSIBLE SEINE
Filed Feb. 27, 1953
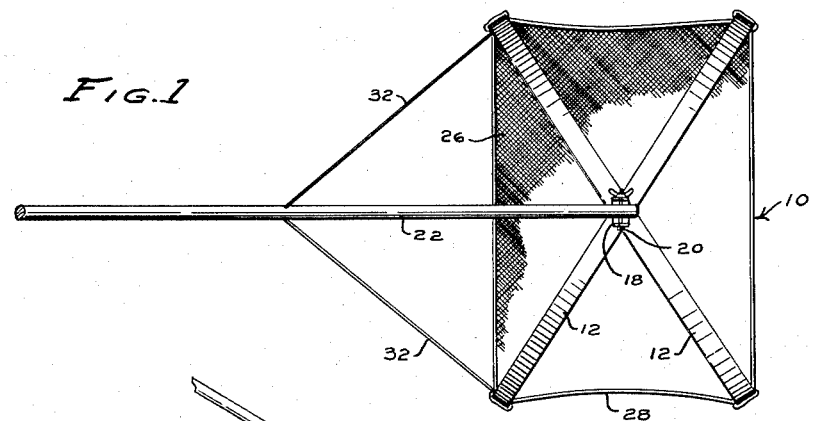
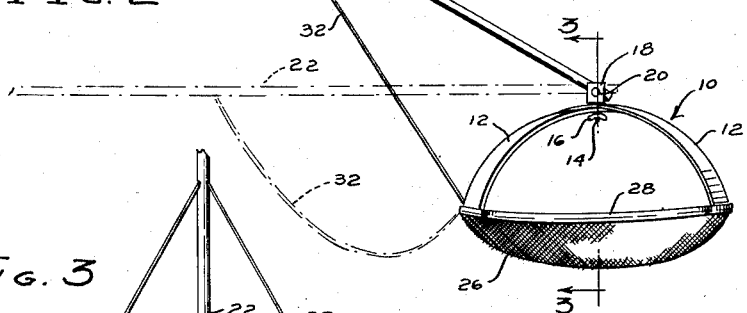
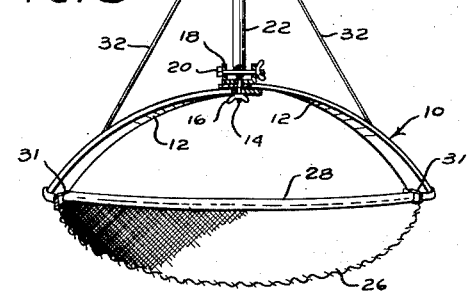
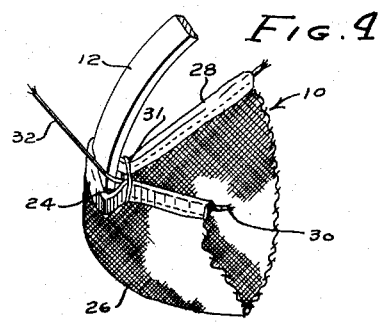
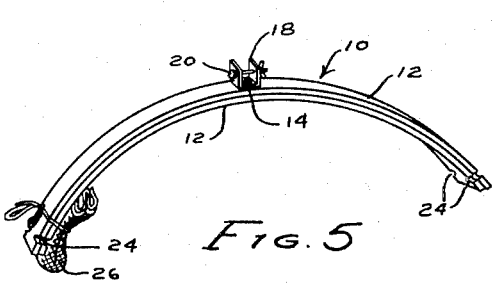
INVENTOR.
WALTER P. HESCH
BY
McMorrow, Berman & Davidson
ATTORNEYS Patented Feb. 23, 1954

2,669,798

UNITED STATES PATENT OFFICE 2,669,798

COLLAPSIBLE SEINE

Walter P. Hesch, Washington, Mo.

Application February 27, 1953, Serial No. 339,379

4 Claims. (Cl. 43—8)

This invention relates to seines, such as those used in collecting crayfish, minnows, and other live baits. Among important objects of the invention are the following:

First, to provide a seine which can be used by a single person with a minimum of effort;

Second, to provide a completely collapsible seine that will be capable of storage in a minimum of space;

Third, to provide a seine which will tilt automatically to a selected angle when dragged over the bottom of a body of water;

Fourth, to permit manufacture of the seine at a minimum of expense; and

Fifth, to provide a seine having a wholly removable mesh body which, when torn, can be replaced at low cost and without the necessity of discarding the remaining parts of the device.

Other objects will appear from the following description, the claims appended thereto, and from the annexed drawing, in which like reference characters designate like parts throughout the several views, and wherein:

Figure 1 is a top plan view of a seine formed in accordance with the present invention;

Figure 2 is a side elevational view, the dotted lines showing a second position of the handle;

Figure 3 is an enlarged sectional view on line 3—3 of Figure 2;

Figure 4 is a fragmentary perspective view showing a corner portion of the seine; and Figure 5 is a perspective showing the seine collapsed.

The seine constituting the present invention has been designated generally by the reference numeral 10, and includes a pair of crossed bows 12. The bows 12 are identical to one another, and can be formed from flat, relatively narrow lengths of arcuately bent hickory, oak, or other strong and durable material.

At their points of crossing, the bows 12 are pivotally connected to one another by means of a vertically disposed bolt 14, having a wing nut 16. When the wing nut 16 is threaded toward the head of the bolt, the bows will be clamped securely to one another, either in the spread position thereof shown in Figure 1, or in the collapsed position shown in Figure 5.

Carried by the bolt 14 is a U-shaped yoke 18, said yoke projecting upwardly from the bolt, with the bolt extending through an opening formed in the bight of the yoke. The upwardly extending arms of yoke 18 have transversely aligned openings receiving a pivot pin 20, said pin 20 being, in the illustrated example of the invention, a conventional bolt having a wing nut threaded thereon.

The pivot pin 20 extends through a transverse opening formed in the inner end of an elongated handle 22, and it will thus be seen that the handle can be swung about the pivot axis thereof to selected positions, such as those shown in full and dotted lines in Figure 2.

The respective ends of bows 12 are extended downwardly, and are formed with opposed, transversely aligned notches 24.

A mesh body 26 is substantially rectangular in outer configuration, when the seine is in use (see Figure 1). The body 26 can be formed of a material such as an open mesh fabric, and in the preferred embodiment of the invention would be so formed. However, except as necessarily required by the scope of the appended claims, I do not desire to limit myself to the use of any particular material in forming the body 26, it being mainly important that said body be flexible throughout its area, adapted to permit replacement at low cost, and wholly foraminous to allow for the free passage of water therethrough.

The periphery of the body is enclosed within a folded, flexible binding 28, and extending through the full length of said binding is a flexible reinforcement 30 formed from a length of stout cord or the like.

As will be noted from Figure 4, the depending ends of the arcuate bows 12 extend downwardly into the body, at the several corners of the body, when the seine is to be used. After the ends of the bows 12 have been so positioned, ties 31 of string or the like are used to securely attach the corners of the body to the ends of the bows. As will be seen, the corners of the body extend about the associated ends of bows 12, after which the ties 31 are formed into loops receiving those portions of the binding 28 adjacent said corners. The ties 31, as will be seen from Figure 4, extend transversely of, and are disposed inwardly of, the adjacent ends of bows 12. When the bows are tightened, they draw the bow-engaged corner portions of the binding 28 into the notches 24, and as will be appreciated, the flexible reinforcements 30 will be tensioned within said notches to securely, but removably, attach the corners of the body to the bows.

Extending from those corners of the body nearer the outer end of the handle is a pair of flexible elements 32, said elements 32 converging toward the handle and being attached to said handle at a location intermediate opposite ends of the handle.

The cords 32 serve as a means limiting tilting of the body 26 about the axis of bolt 20, in one direction, and thus, in use of the seine, the user would grasp the handle 22, and would drag the seine over the bottom of a body of water. When the handle 22 is pulled in the direction of its length, the corners of the body to which elements 32 are attached will swing downwardly, due to the location of the pivotal connection between the handle and bows. Those ends of bows 12 engaged in said corners will, in effect, dig into the bottom, thus causing the body 26 and bows 12 to tilt about the axis of bolt 20. Continued movement of the handle in the direction of its length will then tension the elements 32, limiting tilting of the body and bows. The seine can then be dragged in its tilted position along the bottom.

The seine could, of course, be used without the pole attached, under certain circumstances, and one might, for example, desire to connect a cord to pin 20 after the handle has been detached. The seine can then be lowered into a body of water, to the bottom, and left for a selected period of time, with bait disposed in the mesh body.

The seine is shown collapsed in Figure 5, and it is an important feature of the invention that when collapsed, the device occupies a complete minimum of space, thus to permit its storage in a very small area. As will be noted, to store the seine, it is merely necessary that the several ties 31 be opened, this action causing the body 26 to be disengaged from the bows 12. The body can then be folded as shown in Figure 5, and the bows 12 can be swung into aligned, longitudinally contacting positions. The folded body 26 can be connected to the folded bows by means of one of the ties.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A seine comprising a mesh body; crossed bows connected at their ends to the corners of the body; a handle pivotally connected to the bows at the point of crossing thereof for tilting of the body about an axis extending transversely of the handle; and means extending from selected corners of the body to an intermediate portion of the handle, arranged to limit tilting of the body in one direction.

2. A seine comprising a generally rectangular, mesh body; a pair of crossed bows connected at their ends to the several corners of the body; a handle pivotally connected to the bows at the point of crossing thereof, for tilting of the body about an axis extending transversely of the handle; and a flexible element extending from one side of the body to a portion of the handle remote from said pivotal connection and arranged to limit tilting of the body in one direction.

3. A collapsible seine comprising a mesh body having a flexible peripheral binding; a pair of crossed bows pivotally connected to one another at the point of crossing thereof, the ends of said bows being removably extended into said body in engagement with said binding; and separable ties attaching said binding to said ends of the bows.

4. A collapsible seine comprising a mesh body having a flexible peripheral binding; a pair of crossed bows pivotally connected to one another at the point of crossing thereof, the ends of said bows being removably extended into said body in engagement with said binding; and separable ties attaching said binding to said ends of the bows, said ends of the bows having notches formed therein and said ties being adapted to draw the bow-end-contacting portions of the binding into said notches.

WALTER P. HESCH.

References Cited in the file of this patent

UNITED STATES PATENTS

| Number | Name | Date |
|--------|------|------|
| 90,054 | Searle | May 11, 1869 |
| 181,244 | Campbell | Aug. 22, 1876 |
| 1,264,078 | Jaureguy | Apr. 23, 1918 |